(12) United States Patent
Boeck (10) Patent No.: US 10,738,656 B2
(45) Date of Patent: Aug. 11, 2020

(54) SEALING ASSEMBLY FOR A GAS TURBINE (71) Applicant: MTU Aero Engines AG, Munich (DE)

(72) Inventor: Alexander Boeck, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 174 days.

(21) Appl. No.: 15/946,810

(22) Filed: Apr. 6, 2018

(65) Prior Publication Data
US 2018/0291768 A1 Oct. 11, 2018

(30) Foreign Application Priority Data

Apr. 7, 2017 (EP) ..................................... 17165617

(51) Int. Cl.
*F01D 11/00* (2006.01)
*F01D 25/24* (2006.01)
(Continued)

(52) U.S. Cl.
CPC .......... *F01D 25/243* (2013.01); *F01D 9/065* (2013.01); *F01D 11/003* (2013.01); *F01D 11/005* (2013.01); *F01D 25/28* (2013.01); *F01D 11/001* (2013.01); *F01D 25/246* (2013.01); *F02C 7/28* (2013.01); *F05D 2220/32* (2013.01);
(Continued)

(58) Field of Classification Search
CPC .... F01D 11/005; F01D 11/001; F01D 11/003; F01D 25/243; F01D 9/065; F05D 2240/55; F05D 2240/28; F16J 15/0887; F16J 15/00; F16J 15/02; F16J 15/3284; F16J 15/3292
See application file for complete search history.

(56) References Cited

U.S. PATENT DOCUMENTS 4,314,793 A * 2/1982 DeTolla ................ F01D 11/005
  415/135
5,118,120 A * 6/1992 Drerup .................... F16J 15/021
  277/628

(Continued)

FOREIGN PATENT DOCUMENTS

DE 3708949 A1 9/1987
EP 0657623 B1 3/1999
(Continued)

*Primary Examiner* — Ninh H. Nguyen
*Assistant Examiner* — Behnoush Haghighian
(74) *Attorney, Agent, or Firm* — Davidson, Davidson & Kappel, LLC (57) ABSTRACT

A sealing assembly for a gas turbine is provided, especially an aircraft gas turbine, including: a first component having a first flange portion and a second component having a second flange portion; in the area of the first flange portion and the second flange portion, the first component and the second component being detachably intercoupled by a bolt connection; between the first component, especially a rounded portion, and the second component, especially the second flange portion, a variable interspace being provided that is at least partially sealed by at least one sealing element. The sealing element has a first sealing portion that rests against the first component, especially against the rounded portion, and a second sealing portion that rests against the second component, especially against the second flange portion; the first sealing portion and the second sealing portion being interconnected and extending obliquely relative to each other.

32 Claims, 5 Drawing Sheets

(51) Int. Cl.
*F01D 9/06* (2006.01)
*F01D 25/28* (2006.01)
*F02C 7/28* (2006.01)
*F16J 15/00* (2006.01)
*F16J 15/02* (2006.01)
*F16J 15/3292* (2016.01)
*F16J 15/08* (2006.01)
*F16J 15/3284* (2016.01)

(52) U.S. Cl.
CPC ...... *F05D 2240/55* (2013.01); *F05D 2240/57* (2013.01); *F05D 2250/71* (2013.01); *F05D 2260/30* (2013.01); *F16J 15/00* (2013.01); *F16J 15/02* (2013.01); *F16J 15/0887* (2013.01); *F16J 15/3284* (2013.01); *F16J 15/3292* (2013.01); *Y02T 50/672* (2013.01)

(56) References Cited

U.S. PATENT DOCUMENTS

| | | | |
|---|---|---|---|
| 5,238,365 A | 8/1993 | Petsche et al. | |
| 5,577,887 A * | 11/1996 | Gouyon | F01D 11/005 277/412 |
| 5,848,874 A * | 12/1998 | Heumann | F01D 9/042 415/189 |
| 6,658,853 B2 * | 12/2003 | Matsuda | F01D 9/023 60/753 |
| 6,672,833 B2 * | 1/2004 | MacLean | F23R 3/50 415/116 |
| 6,675,585 B2 * | 1/2004 | Calvez | F23R 3/007 60/753 |
| 6,708,495 B2 * | 3/2004 | Calvez | F23R 3/007 60/753 |
| 6,783,324 B2 * | 8/2004 | Muny | F01D 25/246 415/116 |
| 6,854,738 B2 * | 2/2005 | Matsuda | F01D 9/023 277/632 |
| 6,895,757 B2 * | 5/2005 | Mitchell | F01D 11/005 60/753 |
| 8,104,772 B2 * | 1/2012 | Halling | F01D 11/005 277/606 |
| 9,562,478 B2 * | 2/2017 | Chuong | F02C 7/28 |
| 9,670,791 B2 * | 6/2017 | Broomer | F01D 11/005 |
| 9,845,695 B2 * | 12/2017 | Budnick | F02C 7/28 |
| 9,879,556 B2 * | 1/2018 | Chuong | F01D 25/30 |
| 9,903,216 B2 * | 2/2018 | Chuong | F01D 11/001 |
| 9,945,240 B2 * | 4/2018 | Grant | F01D 9/065 |
| 10,400,616 B2 * | 9/2019 | Tuertscher | F01D 5/28 |
| 2017/0167282 A1 * | 6/2017 | Kloetzer | F01D 11/003 |

FOREIGN PATENT DOCUMENTS

| | | |
|---|---|---|
| EP | 3085899 A1 | 10/2016 |
| GB | 510505 A | 8/1939 |
| GB | 902942 A | 8/1962 |
| GB | 2087501 A | 5/1982 |
| GB | 2188121 A | 9/1987 |

* cited by examiner

SEALING ASSEMBLY FOR A GAS TURBINE

This claims the benefit of European Patent Application EP 17165617.6, filed Apr. 7, 2017 and hereby incorporated by reference herein.

The present invention relates to a sealing assembly for a gas turbine, especially an aircraft gas turbine, including a first component having a first flange portion and a second component having a second flange portion; in the area of the first flange portion and the second flange portion, the first component and the second component being detachably intercoupled by a bolt connection; between the first component, especially a rounded portion, and the second component, especially the second flange portion, a variable interspace being provided that is at least partially sealed by at least one sealing element.

BACKGROUND

In gas turbines, especially in aircraft gas turbines, there is a need to seal static components that are subject to substantial thermal fluctuations and, accordingly, also manifest significant thermally induced displacements or movements. This type of sealing is typically provided by what are generally referred to as sealing plates that press against corresponding sealing surfaces across a pressure difference existing in the gas turbine at a sealing site. It should be appreciated that an interspace between the sealing surfaces is typically rather large for the thermomechanical deformations to be accommodated while simultaneously providing sealing action. Namely, the interspace between the sealing surfaces is larger than a maximum thermally induced, mutual relative displacement of the components that is to be expected. To achieve the desired sealing action in every (operating) state of the gas turbine, it is, therefore, necessary to select relatively large sealing surfaces, against which the sealing plates rest.

SUMMARY OF THE INVENTION

It is an object of the present invention to provide an enhanced sealing assembly that will make it possible to reliably provide a sealing action even for large displacements.

The present invention provides that the sealing element has a first sealing portion that rests against the first component, especially against the rounded portion, and a second sealing portion that rests against the second component, especially against the second flange portion, the first sealing portion and the second sealing portion being interconnected and extending obliquely relative to each other.

An oblique configuration of the two sealing portions makes it possible to eliminate the need for the sealing surfaces to make contact over the entire surfaces thereof, as in the case of known sealing plates. It is, therefore, possible to reduce the size of the sealing surface, thus the area where the sealing portions engage on the two components, especially the rounded portion and the second flange portion, making it possible to altogether reduce the size of the sealing assembly.

The sealing element may be displaceable relative to the first and second component. Thermally induced movements may be compensated by the relative displaceability, while the sealing action is retained.

The sealing element may have a coupling portion that is contiguous to the second sealing portion, a bore being provided in the coupling portion through which a shank of a bolt of the bolt connection is passed. The shank of the bolt may thereby have a securing portion whose diameter is larger than the shank to the extent that only a limited movement of the sealing element is possible along the longitudinal direction of the shank. Moreover, the bore may be shaped as an elongated hole. The elongated hole may thereby be dimensioned to allow the sealing element to be displaced as a function of the variable interspace or of the respective gap to be sealed between the first flange portion and the second flange portion.

Such an embodiment of the coupling portion, along with the bore, allows the sealing element to be readily placed on the shank of a threaded bolt and brought into an installation position upon bolting the two flange portions together. The securing portion may be a type of cuff or sleeve. A retaining portion of the securing portion for the sealing element may thereby serve as a type of limit stop to keep the sealing element securely in position. The elongated hole allows the sealing element to move relative to the shank or the securing portion and thus also relative to both components.

In other specific embodiments, the bore may also have any other desired shape and be larger in cross section than the bolt. This likewise permits the aforementioned displaceability.

The sealing assembly may also include a spring element that is adapted for pressing the first sealing portion and the second sealing toward the first component, respectively flange portion, and toward the second component, respectively flange portion. The spring element may thereby feature a bore, especially in the shape of an elongated hole, through which the shank of the bolt of the bolt connection is passed. It is also provided that the spring element be configured between the securing portion of the shank and the sealing element.

As in the case of conventional sealing plates, pressure differences press the sealing element against the flange portions. However, to ensure a sealing action even when the pressure differences are small, respectively when the gas turbine is at a standstill, the spring element may be used. The spring element is thereby configured to be preloaded in the direction of the site to be sealed, so that it exerts an appropriate pressure force on the sealing element.

The spring element may thereby be braced against the first flange portion or the second flange portion, as well as against the securing portion of the shank. Mounting the spring element in this manner makes it possible for the forces exerted on the sealing element to be optimally transferred into the surrounding structure of the components.

The first sealing portion and the second sealing portion may essentially be configured in a V-shape relative to each other, especially may form an angle of between approximately 60° and 120°, preferably of between approximately 80° and 110°. The first sealing portion and the second sealing portion may thereby be joined by a curved connecting portion, the connecting portion being convexly formed toward the first flange portion or the second flange portion. During operation of the gas turbine, it is especially provided that a convex side of the connecting portion be subject to a lower pressure than the complementary concave side of the connecting portion. The curved connecting portion also renders possible an elastic deflection of the two sealing portions relative to each other, enabling the sealing portions to assume an optimal position in every operating state of the gas turbine or in every mutual relative position of the two components.

The present invention also relates to a gas turbine, especially an aircraft gas turbine, having a turbine center frame, the gas turbine including a plurality of the above described sealing assemblies along the circumferential direction, the first component of a sealing assembly being a housing component, and the second component of the respective sealing assembly being a part of the turbine center frame, especially a panel or a fairing thereof.

In such a gas turbine, at least one further sealing element, especially a sealing member that is adapted to the profile of the sealing element, may be placed in a transition region of two circumferentially adjacent sealing assemblies and in the overlapping region of two adjacent components of the turbine center frame.

The sealing member and the respective sealing elements of the adjacent sealing assemblies may be configured to be at least partially overlapping in the axial direction.

Combining two adjacent sealing assemblies, along with the respective sealing elements thereof, and an additional sealing member, makes it possible to readily and effectively seal joint regions of components in the area of the turbine center frame.

With regard to the gas turbine, directional indications, such as "axial," "radial" and "circumferential" are to be basically understood as relative to the machine axis of the gas turbine, unless explicitly or implicitly indicated otherwise from the context.

It should also be appreciated that the first component and the second component may be manufactured from a ceramic matrix composite (CMC). The sealing element and the spring element are preferably fabricated from a metal.

BRIEF DESCRIPTION OF THE DRAWINGS

The present invention will be explained exemplarily in the following with reference to the enclosed figures and without being limited thereto.

In a schematic and simplified perspective view.

In a schematic and simplified plan view, in the axial direction and in a representation similar to FIG. 1.

In a schematic and simplified sectional view, approximately along a line of intersection III-III of FIG. 2.

In a further simplified schematic representation.

In a simplified and schematic sectional view.

DETAILED DESCRIPTION

Figure 1:
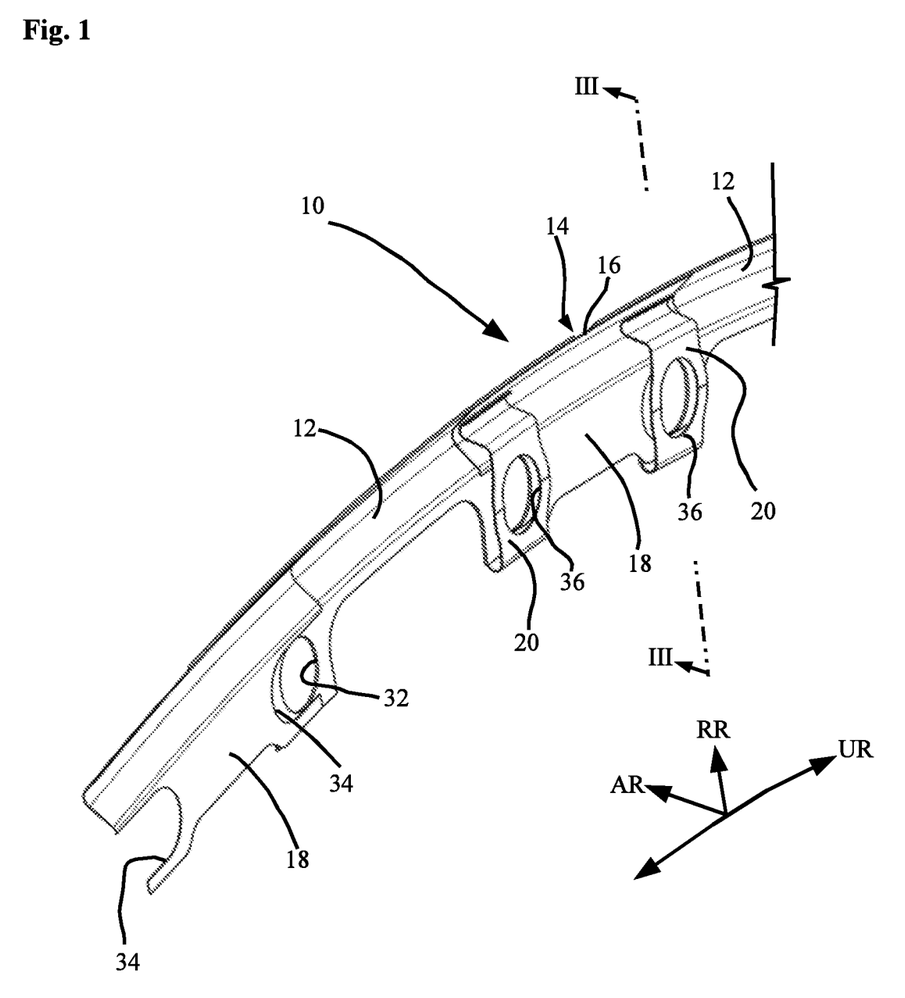
FIG. 1 shows two adjacent sealing elements of a sealing assembly having optionally corresponding spring elements and a sealing member at a joint location between the two sealing elements.
Figure 2:
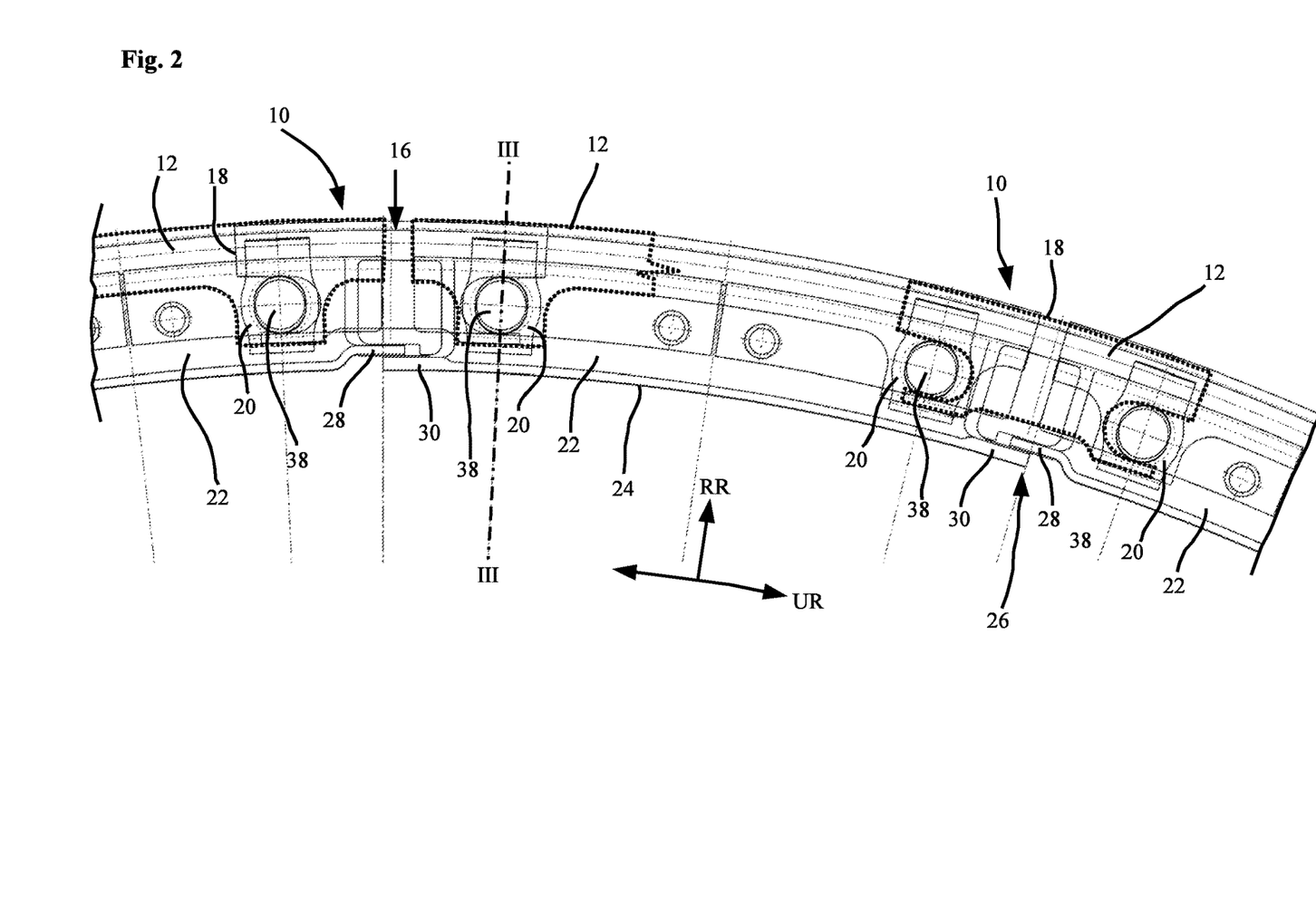
FIG. 2 shows a sealing assembly having sealing elements, optionally corresponding spring elements and sealing members.
Figure 3:
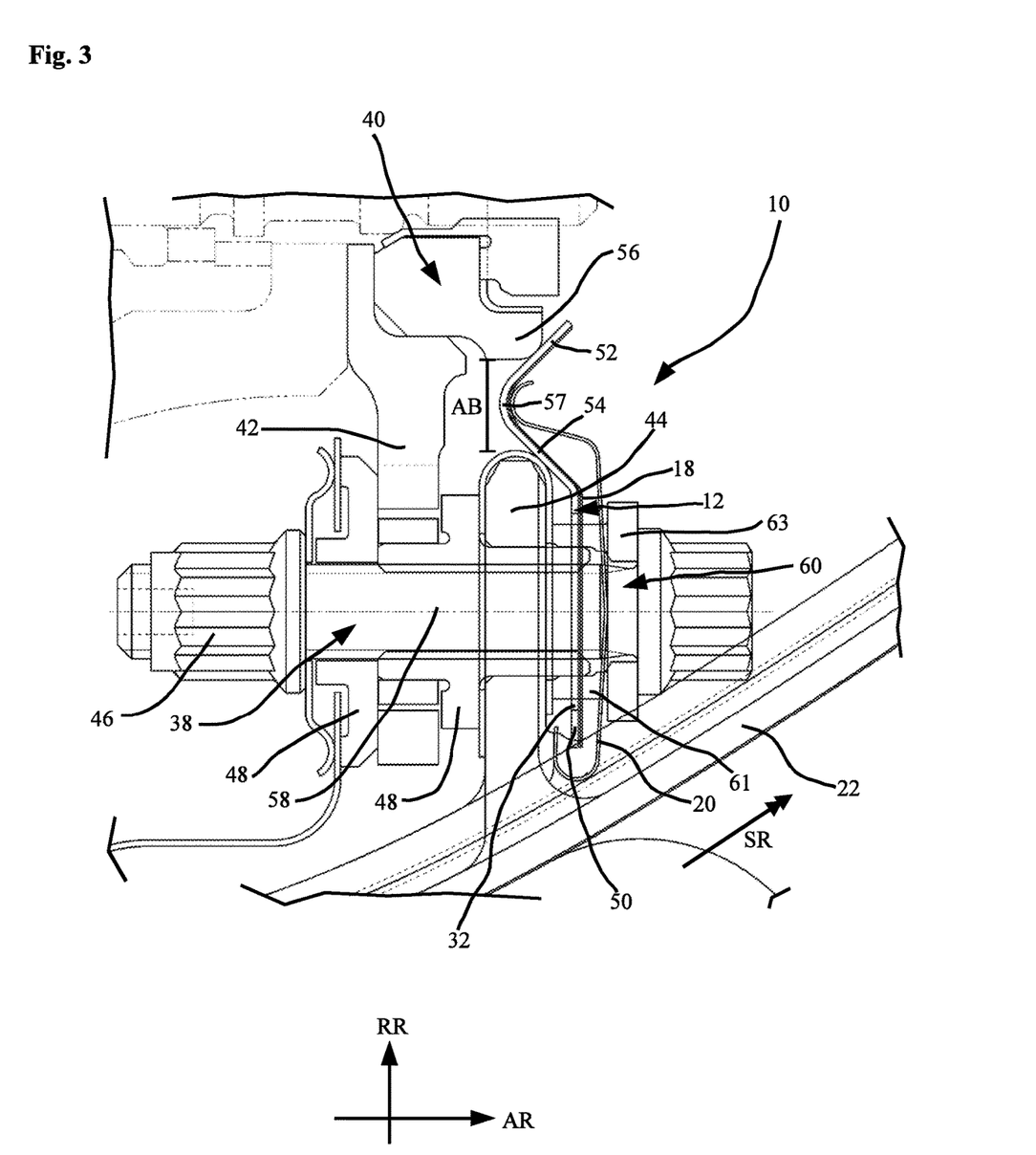
FIG. 3 shows a sealing assembly.

In a simplified and schematic perspective view, FIG. 1 shows two sealing elements 12 that are part of a respective sealing assembly 10 that is shown in greater detail in FIGS. 2 and 3. Sealing elements 12 are adjacently disposed along a circumferential direction UR of a gas turbine (schematically shown fore example in FIG. 3), especially an aircraft gas turbine. A joint location 14 is configured between two adjacent sealing elements 12. An interspace 16 is formed at this joint location 14 between the two sealing elements 12, specifically because of an overlapping configuration of components of the gas turbine, especially of components of a turbine center frame. This interspace 16 is covered or bridged by a sealing member 18. Also shown in FIG. 1 are spring elements 20 that are optionally usable for sealing assembly 10 and are adapted for pressing relevant sealing element 12 toward a site to be sealed.

In a plan view in axial direction AR of a gas turbine, FIG. 2 shows a representation similar to that of FIG. 1. Respective components 22 of the particular sealing assembly are apparent in FIG. 2. Components 22 may be components of a turbine center frame, especially what are commonly referred to as fairings or panels, which, circumferentially, are mutually adjacently disposed. These components are also referred to as second components in this application, especially in the claims and further below with reference to FIG. 3.

In radial direction RR, the two components 22 define a hot gas-conveying channel, which is indicated by reference numeral 24. In the radial direction, channel 24 is sealed by an overlap region 26 at the transition between two second components 22. A radially outer overlapping portion 28 of the one second component 22 and a radially inner overlapping portion 30 of the (other) adjacent second component thereby overlay one another.

Also apparent in FIG. 2 is interspace 16 in the joint region of the two sealing assemblies 10, respectively sealing elements 12 thereof. As already clarified with reference to FIG. 1, this interspace or intermediate space 16 is covered by another sealing member 18. Likewise apparent are optional spring elements 20 that are adapted for pressing, in particular axially, respective sealing elements 12 against a sealing site.

A spring element 20, a sealing member 18 and a sealing element 12 are disposed one behind the other or mutually adjacently relative to the axial direction, which, in FIG. 2, extends orthogonally to the drawing plane. Purely for the sake of the illustration or to make the drawing more comprehensible, the two sealing elements 12 are marked by a more thickly dashed line (contour) in FIG. 2, above left overlap region 26. In the case of right overlap region 26, the contour of sealing member 18 is shown by a more thickly dashed line.

A respective sealing element 12, the corresponding part of sealing member 18, and an optional spring element 20 have respective bores 32, 34 and 36, as is also readily apparent in FIG. 1. Bore 32 of a sealing element 12 thereby has a circular or elongated hole shape. Bore 36 of a spring element 20 may also have a circular or elongated hole shape. To be more precise, bore 34 of sealing member 18 has a U-shaped form and, on one side, is open in the circumferential direction. In the assembled state of sealing assemblies 10, a bolt 38 passes through each of all bores 32, 34, 36.

Sealing assembly 10 is further clarified at this point with reference to the sectional view of FIG. 3, the sectional view being selected approximately in correspondence with lines of intersection III-III of FIGS. 1 and 2. A first component 40 having a first flange portion 42 is apparent from the sectional view in a top region of FIG. 3, which here shows exemplarily a radially outer region of a gas turbine, especially an aircraft gas turbine. First component 40 is especially a housing component of the gas turbine. Sealing assembly 10 also includes a second component 22 having a second flange portion 44. Second component 22 is especially a part of a turbine center frame, for instance, a fairing or a panel. Bolt 38 passes through the two flange portions 42, 44. Bolt 38 is, namely, a threaded bolt, onto which a nut 46 is screwed, so that first component 40 and second component 22 may be or are detachably interconnected.

Along bolt 38, the connection between first component 40 and second component 22 includes still other disk-like, annular or sleeve-shaped elements, which are collectively and simply characterized by reference numeral 48.

An interspace or a gap AB to be sealed is provided or present between first component 40 and second component 22. Interspace AB is drawn exemplarily in FIG. 3 in radial direction RR. However, the interspace could also be drawn obliquely relative to radial direction RR between first flange portion 42 and second flange portion 44. In a turbomachine, such as a gas turbine, especially an aircraft gas turbine, interspace AB must be sealed, it being necessary to consider that first component 40 and second component 22 move mutually relatively due to the thermal effects of hot gas flowing through the gas turbine. In the present example, second component 22 radially inwardly defines a hot gas-conveying, annular channel, the hot gas essentially flowing along a direction indicated by a double arrow SR.

To cover or seal interspace or gap AB, sealing assembly 10 includes sealing element 12. Sealing element 12 has a coupling portion 50. Provided in coupling portion 50 is bore 32 through which bolt 38 passes. In addition, sealing element 12 includes a first sealing portion 52 and a second sealing portion 54. First sealing portion 52 engages on first component 40. It especially engages on a rounded portion 56. Second sealing portion 54 engages on second component 22, in particular on second flange portion 44. Thus, by the two sealing portions 52, 54 thereof, sealing element 12 impedes or prevents fluid from flowing through interspace AB formed between first component 40 and second component 22.

First sealing portion 52 and second sealing portion 54 extend obliquely relative to each other. As is readily apparent from the sectional view of FIG. 3, sealing element 12 has a V-shaped form in the region of the two sealing portions 52, 54. First sealing portion 52 and second sealing portion 54 are interconnected by a bent or curved connecting portion 57. They thereby form an angle of between approximately 60° and 120°, especially approximately between 80° and 110°. In the illustrated example, first sealing portion 52 and second sealing portion 54 extend orthogonally to one another, i.e., they form an angle of approximately 90°. The angle specifications relate especially to a mutual relative position of sealing portions 52, 54 in a stationary operating state of a gas turbine (cold state). It is clear that the angular position may change somewhat due to changing pressure conditions or/and changing temperature conditions during operation of the gas turbine. An angle of originally 90°, for example, may hereby become somewhat larger or smaller.

It is typically solely the pressure difference that presses the two sealing portions 52, 54 against first component 40 or second component 22. During operation of the gas turbine, a pressure prevailing on the left side, thus on the side of sealing element 12 facing first flange portion 42, is lower than that on the right side, in the present example and as viewed in FIG. 3. This pressure difference presses sealing portions 52, 54, formed in a V-shape relative to each other, against the two components 40, 22, especially against second flange portion 44 and against rounded portion 56, which is associated with first component 40. Also readily apparent in FIG. 3 is sealing member 18 that overlaps sealing element 12 in the axial direction.

Figure 4A:
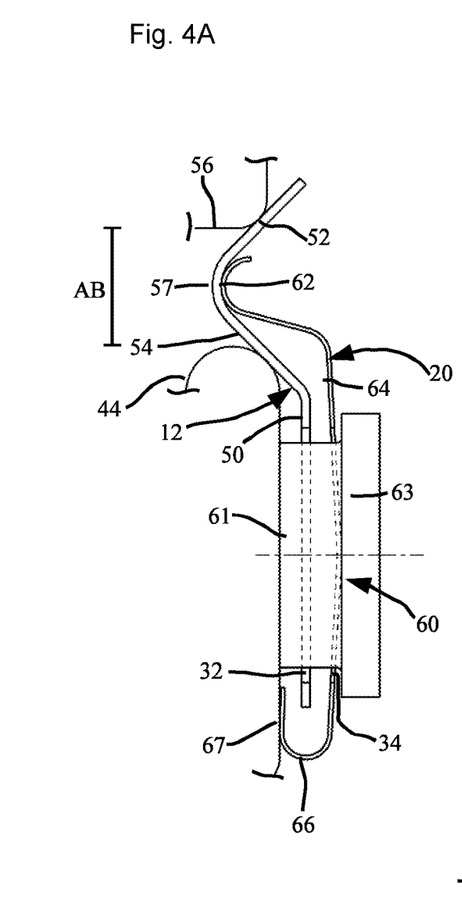
FIGS. 4A, 4B and 4C show the sectional view of the sealing assembly of FIG. 3, different relative positions of components being illustrated at the sealing site in partial figures A) through C).
Figure 4B:
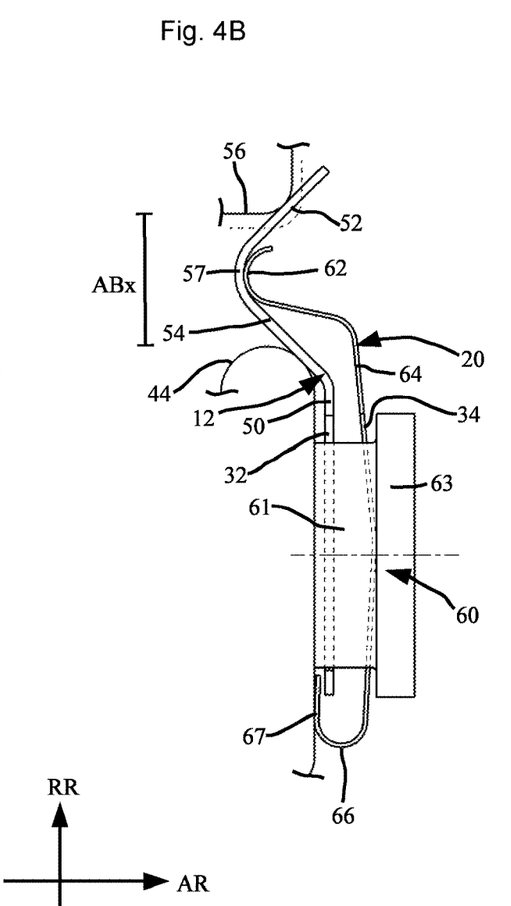
Figure 4C:
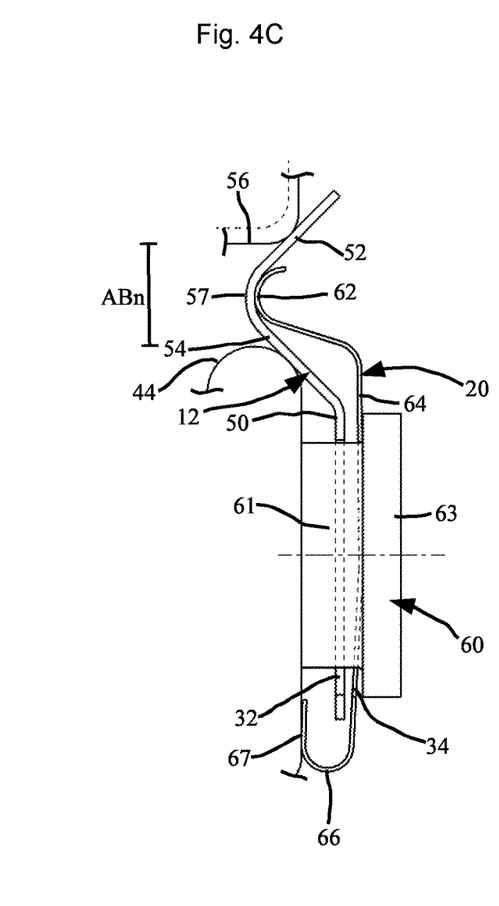

With reference to FIGS. 4A, 4B and 4C, the following explains the attachment of sealing element 12 to bolt 38. Also described in greater detail is the function of optional spring element 20, which is also shown in FIG. 3. The views are greatly simplified in FIGS. 4A, 4B and 4C in comparison to the sectional view of FIG. 3, and only components relevant to the functional description are shown.

FIGS. 4A, 4B and 4C representatively shows a part of rounded portion 56 for first component 40. A part of second flange portion 44 may still be seen for second component 22. Interspace AB is marked between first component 40 and second component 22, or rather between rounded portion 56 and second flange portion 44. Partial FIG. 4A shows a mutual, relative neutral position of the two components 40, 22. Proceeding from this neutral position, partial FIGS. 4B and 4C show mutual, relative end positions of the two components 40, 22, there being a maximum interspace ABx in partial FIG. 4B, and a minimum interspace ABn in partial FIG. 4C. The mutual, relative oblique configuration of the two sealing portions 52, 54 makes it possible to reliably bridge and seal varying interspace AB, ABx, ABn.

To enable sealing element 12 to adapt itself to varying interspace AB, ABx, ABn in the position thereof relative to bolt 38, respectively components 40, 22, bore 32 in coupling portion 50 has an oblong or elongated hole shape. Sealing element 12 is placed against a securing portion 60. Securing portion 60 is a type of cuff or sleeve that surrounds the bolt. Securing portion 60 may be designed as a part that is separate from bolt 38 or from shank 58 thereof and is displaceably accommodated on shank 58. In this context, securing portion 60 features a coupling portion 61 and a retaining portion 63. Coupling portion 61 is larger in diameter than shank 58 of bolt 38. Retaining portion 63 has a somewhat larger diameter than coupling portion 61. Thus, securing portion 60 may also be described as mushroom-shaped, coupling portion 61 forming the stem, and retaining portion 63 the hat.

The diameter of bore 32 of sealing element 12 is somewhat larger in radial direction RR than that of coupling portion 61 of securing portion 60. Retaining portion 63 has a larger diameter than bore 32. Securing portion 60 and, accordingly, coupling portion 61 and retaining portion 63 restrict sealing element 12 in the relative movement thereof in axial direction AR. In spite of the relative movability thereof, sealing element 12 may be hereby prevented from moving undesirably away from the site to be sealed, thereby adversely affecting the desired sealing action. Thus, sealing element 12 is accommodated in axial direction AR between retaining portion 63 and second component 22 and, accordingly, second flange portion 44.

FIGS. 4A, 4B and 4C also show optional spring element 20. In radial direction RR, spring element 20 features a bore 34 having an oblong or elongated hole shape. Spring element 20 encompasses a pressure portion 62, a connecting portion 64, and a supporting portion 66. Supporting portion 66 is curved in a U-shape, so that spring element 20 rests by a leg 67 of the U-shaped supporting portion against the second flange portion. Moreover, by connecting portion 64 thereof, in which bore 64 is also provided, spring element 20 rests against securing portion 60, especially against retaining portion 63. Connecting portion 64 is slightly curved or bent to be slightly concave in the direction of components 40, 22 to be sealed (see, especially FIGS. 4A and 4B). Spring element 20 is braced by the convex side thereof against retaining portion 63 of securing portion 60. Pressure portion 62 is convexly formed toward sealing element 12, especially toward connecting portion 57 thereof. Spring element 20 is adapted for pressing sealing element 12, especially sealing portions 52, 54 thereof against first component 40 and, accordingly, against second component 22, especially against rounded portion 56 and, respectively, second flange portion 44. To be more precise, the corresponding elastic preload force is thereby applied in that spring element 20, especially connecting portion 64 thereof is bent or curved toward sealing element 12.

In every position of the two components 44, 20 relative to each other and in a corresponding position of sealing element 12, as shown in FIG. 4A through 4C, spring element 20 likewise assumes a modified relative position. In addition, in the case of smaller interspace ABn (FIG. 4C), spring element 20 is elastically deformed, especially bent up slightly against the preload force. In every relative position of spring element 20, supporting portion 66, especially leg 67 thereof, thereby remains in contact with second component 22, respectively second flange portion 44 thereof.

Spring element 20 is accommodated in axial direction AR, between retaining portion 63 of securing portion 60 of bolt 38 and sealing element 12. Sealing element 12 is configured in axial direction AR between spring element 20 and second flange portion 44. Thus, spring element 20 is able to exert sufficient pressure (optionally, in addition to the prevailing pressure difference of the surrounding fluid) onto sealing element 12 to achieve or enhance the desired sealing action in the area of interspace AB in every operating state of the gas turbine and, accordingly, in every mutually relative position of components 44, 20. In the case of a small pressure difference, spring element 12 ensures that sealing element 12 presses on the site to be sealed between the two components 40, 22.

It should be appreciated that sealing assembly 10 does not necessarily have to feature a spring element 20. The sealing function may also be achieved by a sealing element 12 without an associated spring element 20. In this respect, FIGS. 4A, 4B and 4C could simply be imagined without spring element 20, for example, without the principle of operation of sealing element 12 being hereby altered.

Figure 5:
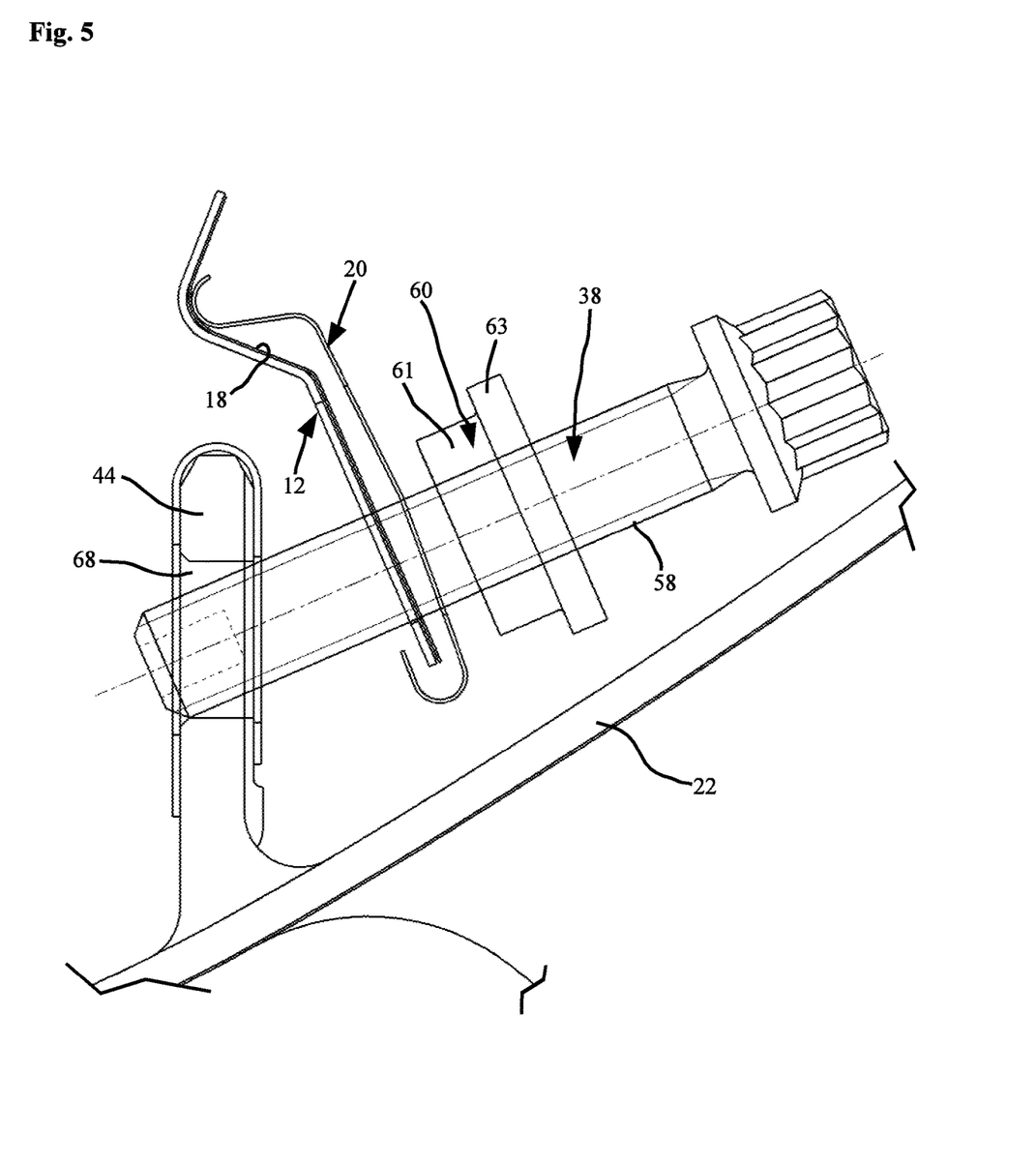
FIG. 5 shows a temporary state when a sealing element having an optional spring element is positioned by a bolt on the component in question.

The sectional view of FIG. 5 shows bolt 38 being introduced into a corresponding bore 68 that is formed in flange portion 44 of second component 22. In this illustration, the configuration of securing portion 60 including coupling portion 61 and retaining portion 63 is also more readily discernible than in the sectional view of FIG. 3. Bore 68 has a somewhat larger diameter than shank 58 of bolt 38. This enables bolt 38 to be introduced obliquely through bore 68, as shown in FIG. 5. Bolt 38 is centered within bore 68 by sliding on a sleeve-type element 48, as is apparent in FIG. 3. When bolt 38 is introduced, shank 58 thereof is already passed through port 32 of sealing element 12, thereby simplifying the installation. Optional spring element 20 may already be connected to shank 58 of bolt 38 upon the introduction thereof. As soon as bolt 38 has been introduced through bore 68, securing portion 60, along with coupling portion 61, abuts against first flange portion 44, thereby preventing bolt 38 from being introduced further. The connection may subsequently be definitively established by attaching the further components, such as annular or sleeve-shaped elements 38 and nut 46, as are apparent from FIG. 3.

For the sake of completeness, it should also be appreciated that further sealing member 18 is also drawn in each instance in FIGS. 3 and 5. For the sake of a simplified representation, sealing member 18 is not shown in FIGS. 4A, 4B and 4C.

REFERENCE NUMERAL LIST 10 sealing assembly
12 sealing element
14 joint location
16 interspace
18 sealing member
20 spring element
22 second component
24 hot gas-conveying channel
26 overlap region
28 overlapping portion
30 overlapping portion
32 bore (of the sealing element)
34 bore (of the sealing member)
36 bore (of the spring element)
38 bolt
40 first component
42 first flange portion
44 second flange portion
46 nut
48 annular/sleeve-shaped element
50 coupling portion (of the sealing element)
52 first sealing portion
54 second sealing portion
56 rounded portion
57 connecting portion (of the sealing element)
58 shank (of the bolt)
60 securing portion
61 coupling portion (of the securing portion)
62 pressure portion
63 retaining portion (of the securing portion)
64 connecting portion
66 supporting portion
67 leg
68 bore (of flange portion 44)
AB, ABn, ABx interspace
AR axial direction
RR radial direction
UR circumferential direction

What is claimed is:

1. A sealing assembly for a gas turbine, the sealing assembly comprising:
   a first component having a first flange portion and a second component having a second flange portion;
   in an area of the first flange portion and the second flange portion, the first component and the second component being detachably intercoupled by a bolt connection;
   a variable interspace being formed between the first component and the second component, the variable interspace being at least partially sealed by at least one sealing element;
   wherein the sealing element has a first sealing portion resting against the first component and a second sealing portion resting against the second component, the first sealing portion and the second sealing portion being interconnected and extending obliquely relative to each other;
   wherein the sealing element has a coupling portion contiguous to the second sealing portion, a bore being provided in the coupling portion, a shank of a bolt of the bolt connection being passed through the bore.

2. The sealing assembly as recited in claim 1 wherein the sealing element is displaceable relative to the first component and relative to the second component.

3. The sealing assembly as recited in claim 1 wherein, disposed on the shank of the bolt is a securing portion whose diameter is larger than the shank to the extent that only a limited movement of the sealing element is possible along a longitudinal direction of the shank.

4. The sealing assembly as recited in claim 1 wherein the bore is shaped as an elongated hole.

5. The sealing assembly as recited in claim 4 wherein the elongated hole is dimensioned to allow the sealing element to be displaced so the coupling portion can move in a radial direction.

6. The sealing assembly as recited in claim 5 wherein variable interspace varies in the radial direction.

7. The sealing assembly as recited in claim 1 further comprising a spring element adapted for pressing the first sealing portion and the second sealing portion toward the first flange portion and the second flange portion.

8. The sealing assembly as recited in claim 7 wherein the spring element has a spring element bore through which a shank of a bolt of the bolt connection is passed.

9. The sealing assembly as recited in claim 8 wherein the spring element bore is an elongated hole.

10. The sealing assembly as recited in claim 8 wherein the spring element is disposed between a retaining portion of a securing portion of the shank and the sealing element.

11. The sealing assembly as recited in claim 10 wherein the spring element is braced against the first flange portion or the second flange portion, as well as against the retaining portion of the securing portion.

12. The sealing assembly as recited in claim 1 wherein the first sealing portion and the second sealing portion are configured in a V-shape relative to each other.

13. The sealing assembly as recited in claim 12 wherein the first sealing portion and the second sealing portion form an angle of between 60° and 120°.

14. The sealing assembly as recited in claim 13 wherein the first sealing portion and the second sealing portion form an angle of between 80° and 110°.

15. The sealing assembly as recited in claim 12 wherein the first sealing portion and the second sealing portion are joined by a bent connecting portion, the connecting portion being convexly formed toward the first flange portion or the second flange portion.

16. A gas turbine comprising: a turbine center frame, wherein, along a circumferential direction, the gas turbine includes a plurality of sealing assemblies each as recited in claim 1, the first component of a respective sealing assembly being a housing component, and the second component of the respective sealing assembly being a part of the turbine center frame.

17. The gas turbine as recited in claim 16 wherein the second component is a panel or a fairing of the turbine center frame.

18. The gas turbine as recited in claim 16 further comprising a further sealing element placed in a transition region of two adjacent sealing assemblies adjacently disposed in the circumferential direction and in a region of an overlapping of two adjacent components of the turbine center frame.

19. The gas turbine as recited in claim 18 wherein the further sealing member is adapted to the profile of the sealing element.

20. The gas turbine as recited in claim 16 wherein the sealing member and the respective sealing elements of the adjacent sealing assemblies are configured to be at least partially overlapping in the axial direction.

21. The sealing assembly as recited in claim 1 wherein the variable interspace is between a rounded portion of the first component and the second flange portion of the second component and wherein the first sealing portion rests against the rounded portion, and the second sealing portion rests against the second flange portion.

22. An aircraft gas turbine comprising the sealing assembly as recited in claim 1.

23. An aircraft gas turbine comprising the gas turbine as recited in claim 16.

24. A sealing assembly for a gas turbine, the sealing assembly comprising:
a first component having a first flange portion and a second component having a second flange portion;
in an area of the first flange portion and the second flange portion, the first component and the second component being detachably intercoupled by a bolt connection;
a variable interspace being formed between the first component and the second component, the variable interspace being at least partially sealed by at least one sealing element;
wherein the sealing element has a first sealing portion resting against the first component and a second sealing portion resting against the second component, the first sealing portion and the second sealing portion being interconnected and extending obliquely relative to each other; and
a spring element adapted for pressing the first sealing portion and the second sealing portion toward the first flange portion and the second flange portion.

25. The sealing assembly as recited in claim 24 wherein the spring element has a bore through which a shank of a bolt of the bolt connection is passed.

26. The sealing assembly as recited in claim 25 wherein the bore is an elongated hole.

27. The sealing assembly as recited in claim 25 wherein the spring element is disposed between a retaining portion of a securing portion of the shank and the sealing element.

28. The sealing assembly as recited in claim 27 wherein the spring element is braced against the first flange portion or the second flange portion, as well as against the retaining portion of the securing portion.

29. A gas turbine comprising:
a turbine center frame, wherein, along a circumferential direction, the gas turbine includes a plurality of sealing assemblies, each sealing assembly including a first component having a first flange portion and a second component having a second flange portion; in an area of the first flange portion and the second flange portion, the first component and the second component being detachably intercoupled by a bolt connection; a variable interspace being formed between the first component and the second component, the variable interspace being at least partially sealed by at least one sealing element; wherein the sealing element has a first sealing portion resting against the first component and a second sealing portion resting against the second component, the first sealing portion and the second sealing portion being interconnected and extending obliquely relative to each other;
the first component of a respective sealing assembly being a housing component, and the second component of the respective sealing assembly being a part of the turbine center frame, wherein the second component is a panel or a fairing of the turbine center frame.

30. A gas turbine comprising:
a turbine center frame, wherein, along a circumferential direction, the gas turbine includes a plurality of sealing assemblies, each sealing assembly including a first component having a first flange portion and a second component having a second flange portion; in an area of the first flange portion and the second flange portion, the first component and the second component being detachably intercoupled by a bolt connection; a variable interspace being formed between the first component and the second component, the variable interspace being at least partially sealed by at least one sealing element; wherein the sealing element has a first sealing portion resting against the first component and a second sealing portion resting against the second component, the first sealing portion and the second sealing portion being interconnected and extending obliquely relative to each other;

the first component of a respective sealing assembly being a housing component, and the second component of the respective sealing assembly being a part of the turbine center frame, and a further sealing element placed in a transition region of two adjacent sealing assemblies adjacently disposed in the circumferential direction and in a region of an overlapping of two adjacent components of the turbine center frame.

31. The gas turbine as recited in claim 30 wherein the further sealing member is adapted to the profile of the sealing element.

32. A gas turbine comprising:

a turbine center frame, wherein, along a circumferential direction, the gas turbine includes a plurality of sealing assemblies, each sealing assembly including a first component having a first flange portion and a second component having a second flange portion; in an area of the first flange portion and the second flange portion, the first component and the second component being detachably intercoupled by a bolt connection; a variable interspace being formed between the first component and the second component, the variable interspace being at least partially sealed by at least one sealing element; wherein the sealing element has a first sealing portion resting against the first component and a second sealing portion resting against the second component, the first sealing portion and the second sealing portion being interconnected and extending obliquely relative to each other;

the first component of a respective sealing assembly being a housing component, and the second component of the respective sealing assembly being a part of the turbine center frame, wherein the sealing member and the respective sealing elements of the adjacent sealing assemblies are configured to be at least partially overlapping in the axial direction.

* * * * *